May 16, 1939.  L. J. EPPEL  2,158,794
FISHHOOK
Filed May 9, 1938
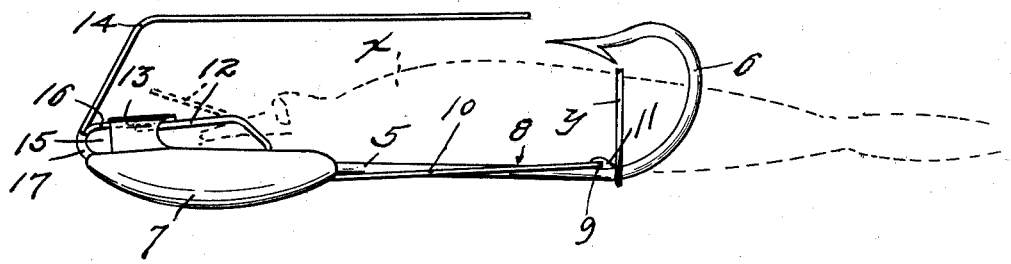
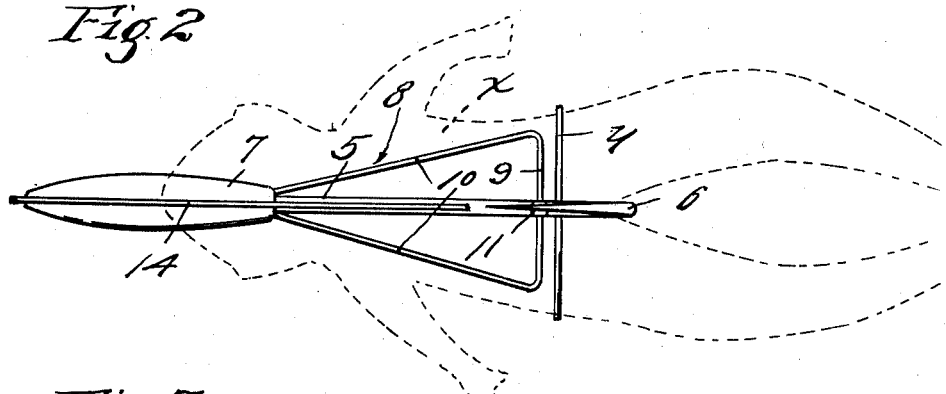
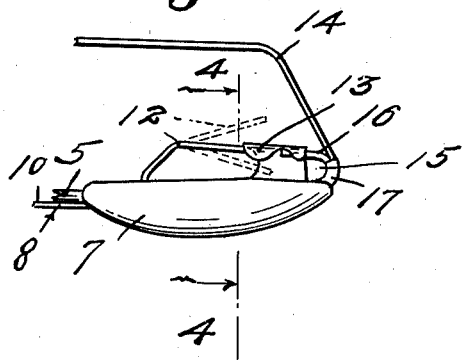
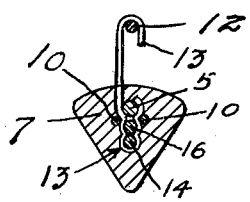
INVENTOR
Leo J. Eppel
By his Attorneys
Kilgore & Kilgore Patented May 16, 1939

2,158,794

UNITED STATES PATENT OFFICE 2,158,794

FISHHOOK

Leo J. Eppel, Minneapolis, Minn.

Application May 9, 1938, Serial No. 206,845

5 Claims. (Cl. 43—40)

My invention relates to improvements in fishhooks, and the objects of my improvement are, first, to provide a fishhook with a weight or sinker that forms a rigid part of the shank of the fishhook; second, to provide said hook with a bait-supporting rack, that also serves as a weed guard; third, to provide said hook with an auxiliary hook for holding bait relative to the rack; and fourth, the improvement affords novel means for securing the several parts of the improved fishhook in assembled relation.

To the above end, generally stated, the invention consists of the novel devices, combination of devices and arrangement of parts hereinafter described and defined in the claims.

In the accompanying drawing, which illustrates the invention, like characters indicate like parts throughout the several views.

Referring to the drawing:

Fig. 1 is a side elevation of the improved hook and also showing the auxiliary bait-hooking hook open by means of broken lines, and further showing, by means of broken lines, a frog on the rack held by said auxiliary hook;

Fig. 2 is a plan view of the parts shown in Fig. 1;

Fig. 3 is a fragmentary view of the weight-equipped end of the shank of the fishhook and parts connected thereto, some parts being shown in different positions by means of broken lines; and Fig. 4 is a detail view principally in section taken on the line 4—4 of Fig. 3, on an enlarged scale.

The numeral 5 indicates the shank of a fishhook having at one end a barb-equipped hook 6 and at its other end a sinker or weight 7 that is cast around the respective portion of said shank and rigidly secured thereto. This weight 7 is designed to give a minimum resistance in the sinking of the hook and the movements thereof through the water under pulling action on said hook by a line. Mounted on the shank 5 is a bait-supporting rack 8 formed from a single piece of wire bent to form a transverse member 9 and a pair of side members 10.

The rack member 9 extends transversely over the shank 5, substantially directly under the barb on the hook 6, and rests at its longitudinal center on said shank and is rigidly secured thereto by solder, or otherwise, as indicated at 11. From the ends of the rack member 9, the rack side members 10 converge rearwardly to the point at which the shank 5 enters the weight 7 and the respective ends of said side members 10 are embedded in said weight just below the shank 5.

For securing bait to the hook in a position in which it rests on the rack 8, I provide an auxiliary bait-holding spring hook 12 rigidly secured to the weight 7 by having one of its ends embedded therein. The free end of the auxiliary hook 12 is normally held under tension interlocked with and covered by a clasp 13 rigidly secured to the weight 7 by having its base portion embedded therein.

A weed guard 14, in the form of a spring wire, overlies the weight 7 and the shank 5. The rear end portion of the weed guard 14 is rigidly secured to the weight 7 by being embedded therein, and the free end thereof is closely associated with the point of the hook 6 and normally projects slightly outwardly thereof.

Between the clasp 13 and the guard 14 is an eye 15, by means of which the hook 6 may be directly attached to a line or a swivel attached to a line, neither said line nor said swivel being shown. This eye 15 is formed by the clasp 13, the weight 7 and a wire 16, one end of which wire is embedded in the weight and the other end of which is anchored to said clasp. This wire 16 is further secured in place by soldering the same to the weed guard 14, as indicated at 17. During the manufacture of the fishhook, the rack 8, auxiliary bait-holding hook 12, clasp 13, weed guard 14 and wire 16 are all held in place and the weight 7 cast around certain parts thereof to rigidly secure the same relative to the shank 5.

To illustrate the way bait is secured to the improved fishhook, a frog $x$ is diagrammatically shown in Figs. 1 and 2 by means of broken lines. It will be noted that the frog $x$ rests on the rack 8 in swimming position and is secured relative to the fishhook by the auxiliary hook 12, which is passed through the jaws of the frog $x$ and held closed by the clasp 13. It will be noted that the hook 6 extends between the legs of the frog $x$ and holds the same against lateral swinging movement. Furthermore, the shank 5 and the hook 6 hold the frog against relative raising or lowering movement. In place of using a live frog as bait, it is, of course, understood that other kinds of bait may be used, for instance, pork rind cut to represent a frog or other bait.

To further secure the bait $x$ to the fishhook, a rubber-band $y$ is preferably, but not necessarily, passed around the body of said bait and the shank 5 forward of the rack 8.

What I claim is:

1. A fishhook having a bait-holding rack comprising an intermediate member and a pair of converging side members, said intermediate member extending transversely of the shank of said hook and supported therefrom, said side members extending from the outer ends of the intermediate member to said shank and secured relative thereto.

2. A fishhook having a weight cast about its shank, a bait-holding rack and an auxiliary bait-holding hook, said rack and auxiliary hook being anchored to the weight.

3. A fishhook having a weight cast about its shank, a bait-holding rack, an auxiliary bait-holding hook, a weed guard, and a clasp normally holding the auxiliary hook closed, said rack, auxiliary hook, weed guard and clasp being anchored to the weight.

4. A device of the class described comprising a shank having on one end a main hook, the pointed end portion of which overlies the shank and projects toward the other end of the shank, a frog holding rack on the shank extending materially outwardly therefrom on each side thereof, and a bait holding hook at the opposite end of the shank from the main hook and adapted to be hooked through one of the jaws of a frog lying on the rack to hold said frog with its legs straddling the main hook and with the pointed end portion of the main hook overlying the body of the frog, said rack extending substantially the full distance between the hooks.

5. The structure defined in claim 4 which further includes means at the pointed end portion of the main hook for holding the body of the frog on the rack.

LEO J. EPPEL.